United States Patent
Sarsanedas Millet

(10) Patent No.: US 10,975,491 B2
(45) Date of Patent: *Apr. 13, 2021

(54) USE OF H₂SO₄ AS AN ELECTROLYTE IN PROCESSES FOR SMOOTHING AND POLISHING METALS BY ION TRANSPORT VIA FREE SOLIDS

(71) Applicant: DRYLYTE, S.L., Barcelona (ES)

(72) Inventor: Pau Sarsanedas Millet, Barcelona (ES)

(73) Assignee: DRYLYTE, S.L., Barcelona (ES)

( * ) Notice: Subject to any disclaimer, the term of this patent is extended or adjusted under 35 U.S.C. 154(b) by 0 days.

This patent is subject to a terminal disclaimer.

(21) Appl. No.: 16/874,314

(22) Filed: May 14, 2020

(65) Prior Publication Data

US 2020/0270763 A1 Aug. 27, 2020

Related U.S. Application Data

(63) Continuation of application No. PCT/SE2019/070027, filed on Jan. 21, 2019.

(30) Foreign Application Priority Data

Jan. 26, 2018 (ES) .................. P201830074

(51) Int. Cl.
| | | |
|---|---|---|
| *C25F 3/16* | (2006.01) | |
| *B01J 39/05* | (2017.01) | |
| *B01J 39/20* | (2006.01) | |
| *C09G 1/02* | (2006.01) | |
| *C25F 3/24* | (2006.01) | |

(52) U.S. Cl.
CPC ................ *C25F 3/16* (2013.01); *B01J 39/05* (2017.01); *B01J 39/20* (2013.01); *C09G 1/02* (2013.01); *C25F 3/24* (2013.01)

(58) Field of Classification Search
CPC .................... C25F 3/16; C25F 3/24
See application file for complete search history.

(56) References Cited

U.S. PATENT DOCUMENTS

| | | | | |
|---|---|---|---|---|
| 3,523,834 | A * | 8/1970 | Hewins ............... | B23H 5/06 148/254 |
| 10,683,583 | B2 * | 6/2020 | Sarsanedas Millet .... | C25F 7/00 |
| 2004/0019389 | A1 * | 1/2004 | Swords ............... | A61F 2/2803 623/23.72 |
| 2005/0014890 | A1 * | 1/2005 | Small ............... | C23F 3/06 524/556 |
| 2010/0096584 | A1 | 4/2010 | Saeki | |
| 2014/0018244 | A1 * | 1/2014 | Taylor ............... | H05H 7/20 505/300 |
| 2017/0144239 | A1 * | 5/2017 | Luo ............... | C25F 7/00 |

FOREIGN PATENT DOCUMENTS

| | | | | |
|---|---|---|---|---|
| DE | 2031833 A1 | * 12/1971 | .......... | B24B 31/003 |
| GB | 1513532 A | 6/1978 | | |
| WO | 2006119058 A1 | 11/2006 | | |
| WO | 2010084213 A1 | 7/2010 | | |
| WO | 2017186992 A1 | 11/2017 | | |

OTHER PUBLICATIONS

AMBERLITE (https://www.lenntech.corn/Data-sheets/Rohm-&-Haas-Amberlite-252-RF-H-L.pdf) (Year: 2000).*
International Search Report received in related application No. PCT/ES2019/070027, dated Apr. 4, 2019 (4 pages).

* cited by examiner

*Primary Examiner* — Nicholas A Smith
(74) *Attorney, Agent, or Firm* — Edell, Shapiro & Finnan, LLC

(57) ABSTRACT

The disclosure relates to the use of $H_2SO_4$ as an electrolyte in processes for polishing metals, specifically metal parts, for example in jewellery. According to some embodiments the polishing is carried out based on ion transport with electrically conductive free solids in a gaseous environment. According to some embodiments the solids comprise spherical particles with porosity and affinity for retaining the electrolyte so that they have appreciable electric conductivity.

17 Claims, No Drawings

USE OF $H_2SO_4$ AS AN ELECTROLYTE IN PROCESSES FOR SMOOTHING AND POLISHING METALS BY ION TRANSPORT VIA FREE SOLIDS

CROSS-REFERENCE TO RELATED APPLICATIONS

This application relates to and claims the benefit and priority to International Application No. PCT/ES2019/070027, filed on Jan. 21, 2019, which relates to and claims the benefit and priority to Spanish Patent Application No. P201830074 filed on Jan. 26, 2018, the entire contents of which are hereby incorporated by reference.

TECHNICAL FIELD

The present invention relates to smoothing and polishing metal parts, such as gold jewellery and alloys, especially encompassing electropolishing processes by means of particles.

BACKGROUND

Different systems for smoothing and polishing metals in mediums with free solids (particles) are known.

For a long time, a wide range of different devices have been used in which mechanical abrasion is produced via the use of particles that are not attached to any support, with different geometries and sizes, and of a greater hardness than the material being treated.

Said devices produce friction of the particles on the parts being treated due to the fact that they produce relative movement between the same.

These devices consist of rotating containers (drums), vibrating containers or sandblasters, for example.

However, all systems based on direct mechanical abrasion, such as the previously mentioned systems, have a serious drawback in that they affect the parts in a way that lacks uniformity, meaning there is a certain proportionality between the pressure exerted by the abrasive means (the particles) on the parts and the amount of material eroded, the protuberant pieces of the parts often being worn and smoothed to an excessive degree.

Furthermore, the total mechanical energy used in said systems is in many cases the reason for damage to the parts, caused by blows and deformations from excessive force.

Moreover, systems based on mechanical abrasion produce surfaces on metal parts with plastic deformation, and by doing so, they inevitably occlude significant amounts of foreign materials, in many cases making treatment unsuitable due to the contamination of the surface layers of the material.

Likewise, polishing systems that are carried out by means of galvanic treatment are known, in which the metal parts being treated are submerged in an electrolyte liquid and without solid particles, such as anodes, known as electropolishing.

Said processes have the advantage in that they produce surfaces that have no surface contamination, unlike the exclusively mechanical abrasive process previously stated.

Now, the levelling effect on the roughness of more than a few microns that is achieved is in many cases insufficient, and thus said treatments are used mainly as a finishing for prior mechanical abrasion processes.

Furthermore, there are galvanic processes in which the metal parts being treated are submerged in an electrolytic liquid that contains solids (particles) that freely move therein.

The electrolytes developed for said processes produce thicker anodic layers than in galvanic processes without particles, such that when the particles contained therein mechanically interact with the anodic layer, the roughness is efficiently smoothed down to one millimetre.

However, in both cases, the galvanic processes used to date often produce defects, such as pitting or stepped surfaces, which are related to the crystalline structure and composition of the metal being treated, the use thereof in many cases being restricted to parts which, due to their composition (alloy) and moulding and shaping treatment, have empirically demonstrated that they can be treated without said unacceptable defects.

To solve these drawbacks, this applicant is the holder of a Spanish patent application published as ES2604830A1, which discloses a process for smoothing and polishing metals by ionic transport by means of free solids, as well as electrically conductive solids to carry out said process, comprising connecting the parts to the positive pole of a current generator by means of a clamping element associated with a device, and subjecting it to friction with particles of electrically conductive free solids incorporated in a container with a gaseous environment occupying the interstitial space and which electrically contact the negative pole (cathode) of the current generator, directly through the container or a ring that acts as a cathode, and wherein the solid bodies are particles with a porosity and affinity able to retain the electrolyte liquid below the saturation amount, such that they have electrical conductivity.

Now, the object of the present invention is to provide the market with the use of H2SO4 as an ideal electrolyte for this type of process and, furthermore, in the ideal proportion of the same in the solution based on the type of metal or alloy of the parts to be polished to obtain optimal results.

As is known, H2SO4 is an acid that is widely used for stripping, etching and electropolishing processes on a wide variety of metals. It forms soluble salts with almost all metals, since it is a polyprotic acid, and substantiates the existence of anodic layers that make electropolishing possible.

Likewise, as can be seen up to now, using acids with high vapour pressures such as: HNO3, HF, HCl, etc., there is inevitable transportation of the electrolyte due to evaporation and subsequent condensation in the core of the polymeric spheres and on the surface of the parts to be polished. This leads to electrochemical attacks that are not confined to the strict geometric relationship between the spheres and the surface to be polished and, as a result, defective results.

On the other hand, using H2SO4 with a very low vapour pressure leads to fewer risks of said attacks. Thus, the results, for example on Ti, are very suitable, leading to spectacularly shiny surfaces and a very low final roughness.

On the other hand, and as a reference of the current state of the art, it can be affirmed that the applicant is unaware of the use of H2SO4 as an electrolyte in processes for smoothing and polishing metals by ion transport via free solids or other electropolishing processes.

SUMMARY

The present invention relates to the use of H2SO4 as an electrolyte in processes for smoothing and polishing metals by ion transport via free solids, providing advantages and features that will be described in detail below and which are notably novel in comparison to that which is currently known in this field of application.

Provided is the use of a solution based on H2SO4 as an electrolyte liquid in processes for smoothing and polishing metal parts, for example pieces of jewellery, based on ion transport via free solids, wherein said bodies are electrically conductive and are incorporated together in a gaseous environment, arranging the metal parts in such a way that they connect to the positive pole of an electrical power source, such as a direct current generator and, preferably, moving with respect to the assembly of solids (particles) and being arranged such that they make electrical contact with the negative pole of the power source, and wherein the aforementioned solids are macroporous polymeric particles able to retain therein a specific amount of said electrolyte liquid, such that they have appreciable electrical conductivity that makes them electrically conductive, the electrolyte in question consisting of a H2SO4 solution used in different proportions based on the type of metal or alloy to be smoothed or polished.

The use of the H2SO4 electrolyte liquid is particularly applicable for polishing steel, stainless steel, Cr—Co, titanium and aluminium alloys.

DETAILED DESCRIPTION

Disclosed is the use of H2SO4 as an electrolyte in processes for smoothing and polishing metals by ion transport via free solids, and more specifically, for smoothing and polishing metal parts, for example pieces of jewellery, but not being limited thereto, based on ion transport that is carried out with free solids (particles) that are electrically conductive in a gaseous environment, said solids consisting of spherical particles with sufficient porosity and affinity for retaining a specific amount of said electrolyte liquid so that they have appreciable electrical conductivity.

The aforementioned free solids used for said process may be macroporous polymeric spheres exchanging ions of sulfonated polystyrene and, more specifically, spheres constituted by a solid styrene-divinylbenzene copolymer matrix with sulfonic functional groups SO3-, with a density of 1.24 Kg/m3, with an ion exchange capacity equal to or greater than: 1.7 eq/L, with a diameter comprised between 0.6 and 0.8 mm and with a water holding capacity of 52-58%, consisting of, for example, a resin such as the one marketed under the tradename AMBERLITE® 252RFH.

The reason for using these types of spheres is that, considering they are made up of an organic polymer and, in turn, contain a high proportion of interconnected pores, uniformly distributed in the core of the spheres, they form a material that offers a suitable compromise between rigidity and holding capacity for the electrolyte liquid and, at the same time, capacity for the transitory release of electrolyte liquid under pressure and the resulting deformation of the spheres. Furthermore, they also have a high chemical resistance, withstanding high concentrations of strong acids, such as sulfuric acid H2SO4. They also have suitable diameters for advantageously polishing and levelling the roughness present in the majority of the parts for metal dental prostheses.

In any case, as mentioned, the electrolyte liquid to be used is an aqueous solution of H2SO4 with a variable concentration based on the type of metal or alloy of the part to be polished. The use of this electrolyte has been specifically studied on steels, stainless steels, Cr—Co alloys, as well as Nickel, Titanium and Aluminium alloys.

Steel, Stainless Steel or Cr—Co Alloys

According to one embodiment, the use of polymeric spheres containing an absorbed aqueous solution of H2SO4 with a concentration between 8% and 25% (preferably 15%), and preferably in a proportion of 40% to 50% of electrolyte on the dry polymer are used to polish parts made of steel, stainless steel or Cr—Co alloys to be polished.

NI Alloys

As an electrolyte absorbed for processing parts made of "Inconel" type Ni alloys, the use of an aqueous solution of H2SO4 with a concentration between 15 and 30% (preferably 20%) is envisaged.

Ti

As an electrolyte absorbed for processing parts made of Ti and the alloys thereof, the use of a solution of H2SO4 in an alcohol with a molecular weight lower than 100 is envisaged, said alcohols able to be simple or polyols, such as: methanol, ethanol, propanol, ethylene glycol, diethylene glycol, propylene glycol, glycerol, used separately or simultaneously.

The electrolyte used for Ti has a very low water content, less than 5%, thereby counteracting the strong tendency of said metal to be passivated by oxidation according to: Ti+2H2O=TiO2+4H+4e−

By using alcohols with a low viscosity, such as methanol and ethanol (methanol: 0.5 cps, water: 1 cps), it is possible to achieve, on the one hand, a good absorption capacity in the polymeric particles of the styrene-divinylbenzene copolymer, and on the other hand, a high electrolyte mobility through the particle pore network, thereby resulting in a smoothing and polishing process with a speed similar to that of the processes for steels and Cr—Co alloys (between 2 and 10 microns of thickness/min.)

Preferably, and due to the aforementioned reasons, an electrolyte composed of methanol and sulfuric acid with a sulfuric acid concentration with respect to the methanol between 10 and 30%, preferably 20%, is used.

The water content must preferably be limited to a maximum of 5%.

Example: Methanol: 80% H2SO4: 18% H2O: 2%

The process is preferably developed in an anhydrous gas atmosphere free of 02 (for example: N2, CO2, Ar, etc.)

Preferably, with an applied voltage between 30 and 80V and with cyclical polarity reversals with a temporary predominance of the semi-period wherein the parts to be polished are anodes, for example: 2 seconds+0.5 seconds.

The addition of halides, preferably chlorides and/or fluorides in proportions between 0.05 and 0.4% is preferably envisaged as additives to accelerate the process.

Example: Methanol: 80% H2SO4: 17.8% H2O: 2% NaCl: 0.2%

The small size of the Cl atoms, in addition to the fact that the chlorides of Ti are easily soluble, justifies the possibility of efficiently counteracting the passivity due to the formation of oxide layers and, therefore, results in an efficient ion transport.

For smoothing and polishing aluminium, electrolytes similar to those suitable for Ti but with a greater water and chloride content are preferably used.

Methanol: 30% water: 40% H2SO4: 17% NaCl: 13%

The electrolyte liquid content with respect to the polymeric absorbent bodies is preferably between 40 and 50%.

Having sufficiently described the nature of the present invention, as well as the ways of implementing it, it is not considered necessary to extend its explanation for any expert in the state of the art to understand its scope and the advantages which derive from it, specifying that, within its essence, it can be carried out in other embodiments that differ in detail from the one provided by way of example, and which are also covered by the requested protection, provided that they do not alter, change or modify its fundamental principle.

What is claimed is:

1. A method for polishing a metal part, the method comprising:

electrically coupling the metal part to a first pole of a current generator; and subjecting the part to friction with non-electrically conductive polymeric bodies charged with a negative electrical charge in a gaseous environment, the non-electrically conductive polymeric bodies retaining an aqueous solution of $H_2SO_4$ as an electrolyte, the non-electrically conductive polymeric bodies being electrically coupled to a second pole of the current generator and configured to polish the metal part via ion transport, the second pole having opposite polarity to the first pole.

2. The method according to claim 1, wherein the first pole is a positive pole and the second pole is a negative pole.

3. The method according to claim 1, wherein the non-electrically conductive polymeric bodies are porous.

4. The method according to claim 1, wherein the non-electrically conductive polymeric bodies are macroporous.

5. The method according to claim 1, wherein the non-electrically conductive polymeric bodies include interconnected pores to retain the electrolyte.

6. The method according to claim 1, wherein the non-electrically conductive polymeric bodies undergo deformation during the polishing of the metal part.

7. The method according to claim 6, wherein the electrolyte is released under pressure from the non-electrically conductive polymeric bodies during the deformation.

8. The method of claim 1, wherein the non-electrically conductive polymeric bodies comprise an ion exchange resin.

9. The method of claim 8, wherein the ion exchange resin comprises sulfonated styrene-divinylbenzene copolymers.

10. The method according to claim 1, wherein the non-electrically conductive polymeric bodies comprises a styrene-divinylbenzene copolymer matrix with sulfonic functional groups $SO_{3-}$.

11. The method according to claim 10, wherein the styrene-divinylbenzene copolymer matrix with sulfonic functional groups $SO_{3-}$ has an ion exchange capacity equal to or greater than 1.7 eq/L.

12. The method according to claim 1, wherein the non-electrically conductive polymeric bodies are spherical in shape with a diameter of between 0.6 mm and 0.8 mm.

13. The method according to claim 1, wherein the metal part is made from a material selected from the group consisting of steel, stainless steel and Cr—Co alloys and the electrolyte comprises an 8% to 25% concentration of $H_2SO_4$.

14. The method according to claim 1, wherein in each of the non-electrically conductive polymeric bodies that retain the electrolyte, the electrolyte comprises 40% to 50% by weight of the non-electrically conductive polymeric body.

15. The method according to claim 13, wherein in each of the non-electrically conductive polymeric bodies that retain the electrolyte, the electrolyte comprises 40% to 50% by weight of the non-electrically conductive polymeric body.

16. The method according to claim 1, wherein the metal part is made from a Ni alloy and the electrolyte comprises a 15% to 30% concentration of $H_2SO_4$.

17. The method according to claim 1, further comprising moving the metal part relative to the solid non-electrically conductive polymeric bodies.

* * * * *